(12) United States Patent     (10) Patent No.: US 7,861,557 B2
Guskov et al.     (45) Date of Patent: Jan. 4, 2011

(54) PLASMA TORCH FOR MAKING SYNTHETIC SILICA

(75) Inventors: Mikhail I. Guskov, St. Petersburg (RU); Mohd A. Aslami, Sturbridge, MA (US); Dau Wu, Fallbrook, CA (US)

(73) Assignee: Silica Tech, LLC, White Plains, NY (US)

( * ) Notice: Subject to any disclaimer, the term of this patent is extended or adjusted under 35 U.S.C. 154(b) by 1041 days.

(21) Appl. No.: 11/646,362

(22) Filed: Dec. 28, 2006

(65) Prior Publication Data

US 2007/0169516 A1    Jul. 26, 2007

Related U.S. Application Data

(60) Provisional application No. 60/754,281, filed on Dec. 29, 2005.

(51) Int. Cl.
   *C03B 37/018* (2006.01)
(52) U.S. Cl. .............................. 65/391; 65/421; 65/423
(58) Field of Classification Search .................. 65/385, 65/391, 395, 436, 439, 440, 426, 421, 502, 65/529–532; 239/79–92, 95–96, 127.1, 127.3, 239/302–379, 423, 418; 431/1–12, 278–285, 431/127–152, 191–194, 258–266, 331–342; 219/200–538, 686
See application file for complete search history.

(56) References Cited

U.S. PATENT DOCUMENTS

| | | | |
|---|---|---|---|
| 4,162,908 A * | 7/1979 | Rau et al. .................. | 65/60.53 |
| 4,440,558 A | 4/1984 | Nath et al. | |
| 5,420,391 A * | 5/1995 | Delcea .................. | 219/121.47 |
| 6,215,092 B1 | 4/2001 | Goudeau et al. ....... | 219/121.59 |
| 6,253,580 B1 * | 7/2001 | Gouskov et al. .............. | 65/391 |
| 6,536,240 B1 | 3/2003 | Gouskov et al. | |

FOREIGN PATENT DOCUMENTS

EP      1213950      6/2002

* cited by examiner

*Primary Examiner*—Matthew J. Daniels
*Assistant Examiner*—Yana Belyaev
(74) *Attorney, Agent, or Firm*—Patton Boggs LLP

(57) ABSTRACT

The improved plasma torch for making synthetic silica includes use of nitrogen screen gas from outer quartz tubing to provide active environment isolation. In addition, the present induction plasma torch includes a ring disk for more compact but complete environmental protection (360 degree coverage). It also includes offsetting and switching the position of the chemical injection nozzles for allowing improved deposition in both directions, when operated in a horizontal mode. Further, the present induction plasma torch maintains laminar flow for the injected chemicals and the middle quartz tube is provided with a concave section for increasing the average enthalpy of plasma jet, thus improving the efficiency of the plasma torch. In addition, it may utilize more plasma gas inlets. It also includes chemical injection nozzles having a downward angular inclination.

20 Claims, 7 Drawing Sheets

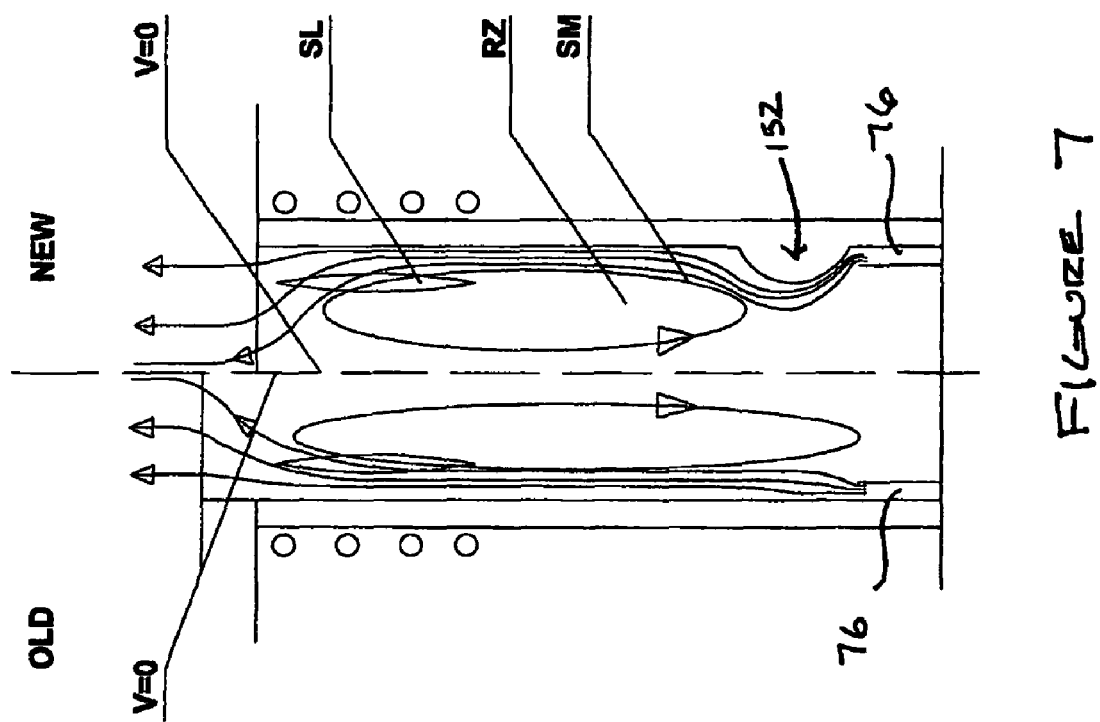

US 7,861,557 B2

PLASMA TORCH FOR MAKING SYNTHETIC SILICA

CROSS-REFERENCES TO RELATED APPLICATIONS

This application claims the benefit of U.S. Provisional Application No. 60/754,281, filed 29 Dec. 2005.

FIELD OF THE INVENTION

The present invention relates to methods for making pure synthetic silica tubes, doped synthetic silica tubes, rods for optical fiber applications, and blanks for ultraviolet transmitting optical components. More particularly, it concerns a process for making such tubes and optical components by depositing silica with low hydroxyl content through a plasma process.

PROBLEM

The prior art teaches various approaches for fabricating silica glass starter tubes, and for making optical fiber preforms. Starter tubes can be formed by heating silica and extruding it through an aperture. Both starter tubes and optical fiber preforms can be made by depositing doped or undoped silica onto a target using one of several techniques such as modified chemical vapor deposition (NCVD), vapor axial deposition (VAD), outside vapor deposition (OVD). Each of these methods starts with providing a rotating target, typically shaped in the form of a tube or a solid rod, and formed from glass, ceramic or one of several other materials. In certain cases, the rod or tube becomes an integral part of the preform but, in other cases, the rod will be removed. A heat source, such as a gas burner or a plasma source is positioned beneath the rotating target. The heat source will provide the required energy for the glass-forming reactions to form glass particles. Depending upon the nature of the process, these deposited glass particles are ready for the next processing, d and sintering steps such as VAD or OVD processes. If it is an MCVD process, these particles will be fused into vitreous quartz by the same heat source. Generally, particle sizes that are between 0.05 to 0.2 mm are ideal for the flame hydrolysis chemical reaction that is found in the OVD and VAD processes. These processes involve two steps namely, forming soot particles by the flame hydrolysis, and then consolidating the soot particles in a separate furnace. A slightly larger diameter of the soot particle is preferred for these processes, because it improves the deposition rate.

When the target is mounted horizontally, the heat source travels along the length of the target to ensure uniform deposition. If the target is a tube, the glass forming particles and materials may be deposited either on the inside surface of the tube, in which case the outer diameter remains constant, or on the outside of the tube, in which case the outer diameter grows. When the target is mounted vertically, it rotates around its vertical axis, and grows in both radial and axial directions. This results in a substantially cylindrical product whose diameter and length increase as deposition continues.

U.S. Pat. No. 5,522,007 to Drouart et al. teaches the use of plasma deposition to build up an optical fiber preform having high hydroxyl ion concentration. In this reference, hydroxyl ions are deliberately entrained in a plasma generating gas by passing the gas through a water tank before it is introduced into one end of a plasma torch having an induction coil. This introduces an amount of water into the process gas stream. The plasma torch projects molten silica particles mixed with hydroxyl ions onto a rotating substrate preform. This results in a preform having an average hydroxyl ion concentration lying in the range of 50-100 ppm deposited onto the target preform. In addition, the preferred raw material in Drouart is silica particles.

U.S. Pat. No. 5,609,666 to Heitmann teaches the use of a tubular substrate formed from a porous oxide ceramic to form a quartz glass tube. A burner operated with a mixture of methane, silicon tetrachloride ($SiCl_4$) and oxygen is moved back and forth along the tubular substrate to deposit glass soot thereon. Simultaneously, a drying gas mixture comprising chlorine or thionyl chloride, along with other gases, is passed through the interior of the tubular substrate along the latter's axis. The purge gas removes the hydroxyl ions from the deposited glass soot. The deposited, purged glass soot body is removed from the tubular substrate and then subjected to further drying and sintering to form a tube or rod with a low hydroxyl concentration.

Audsley & Bayliss reported in the Journal of Applied Chemistry Vol. 19 pp 33-38 (1969) using four different plasma torch designs to induce oxidation reaction of silicon tetrachloride. They found that they could reach a complete oxidation at flow rate of 67 g/min. Nonetheless, Audsley & Bayliss neither investigated the moisture content of the glass nor included an outer tube to supply a screen gas to isolate environmental influences. Moreover, the chemicals were injected from the bottom of the torch without the injection nozzle.

In JP 4,231,336 Seto et al. claimed that a plasma torch could induce flame hydrolysis when making silica. It is well known that a plasma flame is a dry flame. Seto et al. did not describe introducing hydrogen or hydrogen containing compounds into the plasma flame. Furthermore, it is believed doubtful that flame hydrolysis can take place in their proposed process.

In U.S. Pat. No. 4,162,908, Rau et al. discloses a method of using an induction coupled plasma burner to make synthetic quartz glass, specifically fluorine containing synthetic hydroxyl ion-free quartz glass. The plasma torch has 3 concentric quartz glass tubes, the center tube is used for supplying the reaction chemicals, and oxygen gas is fed to the middle and outer rings to form oxygen plasma. Rau et al. did not use any screen gas to isolate the influence from the environment, and they did not disclose any details of a chemical feeding tube or nozzle. Additionally, there was no discussion about optimizing the operation of the chemical feeding locations to improve the deposition rate of the chemicals.

In U.S. Pat. No, 4,402,720, Edahiro et al. discloses using a plasma torch to make nitrogen-doped silica glass. Edahiro et al. have spent great efforts in designing their nozzle to separate the reactant chemicals before entering the reaction zone. They do not use any measures to isolate the influence from the environment.

In U.S. Pat. Nos. 6,253,580, and 6,536,240 Gouskov et al. disclose-the use of a plasma torch having two opposing plasma stabilizer bars protruding outwardly from the center axis of the plasma torch. These stabilizer bars are U-shaped troughs for providing environmental isolation in a linear direction corresponding to their orientation, but not in a 360° direction.

Therefore, there is a need for a plasma torch that forms tubes, performs, or both for the manufacture of optical fibers in a continuous process with low impurity levels, such as hydroxyl ions. Additionally, processes that involve soot deposition that require subsequent drying and sintering, are expensive and time consuming, thus there is a need for quicker and less expensive soot deposition and consolidation methods.

SOLUTION

The above described problems are solved and a technical advance achieved by the present improved plasma torch for making synthetic silica that includes replacing stabilizer bars with ring disks to make the plasma torch more compact and rigid. In addition, it uses a screen gas, such as nitrogen, as an active curain for providing more complete environmental isolation in 360° than the passive protection only in linear direction of commonly stabilizer bars. One or more ring disks maybe used for improved deposition results.

The present plasma torch further includes off-center placement of the chemical injection nozzles. This arrangement provides for deposition in both directions without degrading the qualit of the deposited glass.

The present plasma torch further maintains laminar flow for the injected chemicals by the careful fabrication, inspection, and selection of appropriate injection nozzles. In addition, the middle quartz tube of the plasma torch has a formed concave section. This design increases the enthalpy of the plasma jet without having to use a larger RF generator. Thus, the deposition rate and efficiency are further improved.

Also, the present plasma torch includes additional plasma gas inlets for providing better control over the makeup and flow of the plasma gas. Further, the present plasma torch also includes chemical injection nozzles that can be angled downward.

SUMMARY

The present plasma torch produces good quality fused silica products in a one-step process while concurrently achieving a very low bubble count, better than 70% deposition efficiency, and 9 g/min average deposition rate. Further, the present plasma torch maintains a moisture content of less than 1 ppm for the deposited glass. In summary with all these modifications, the deposition rate, efficiency, and product quality are significantly increased without using a larger RF generator. The present plasma torch uses a nitrogen screen gas from the outer quartz tubing to provide active environment isolation that replace the prior art stabilizer bars with a ring disk for more compact but complete protection (360 degree coverage). In addition, the present plasma torch includes offset and switched chemical injection nozzle positions for allowing deposition in both directions. Further, the present plasma torch maintains laminar flow for the injected chemicals. It also has a formed concave section on the middle quartz tube. It uses more plasma gas inlets and has chemical injection nozzles that are angled downward.

BRIEF DESCRIPTION OF THE DRAWINGS

FIG. 7 illustrates a cross-section comparison of the flow pattern between a prior art plasma torch and an embodiment of the present plasma torch according to an embodiment of the present invention.

DETAILED DESCRIPTION OF THE DRAWINGS

Figure 1:
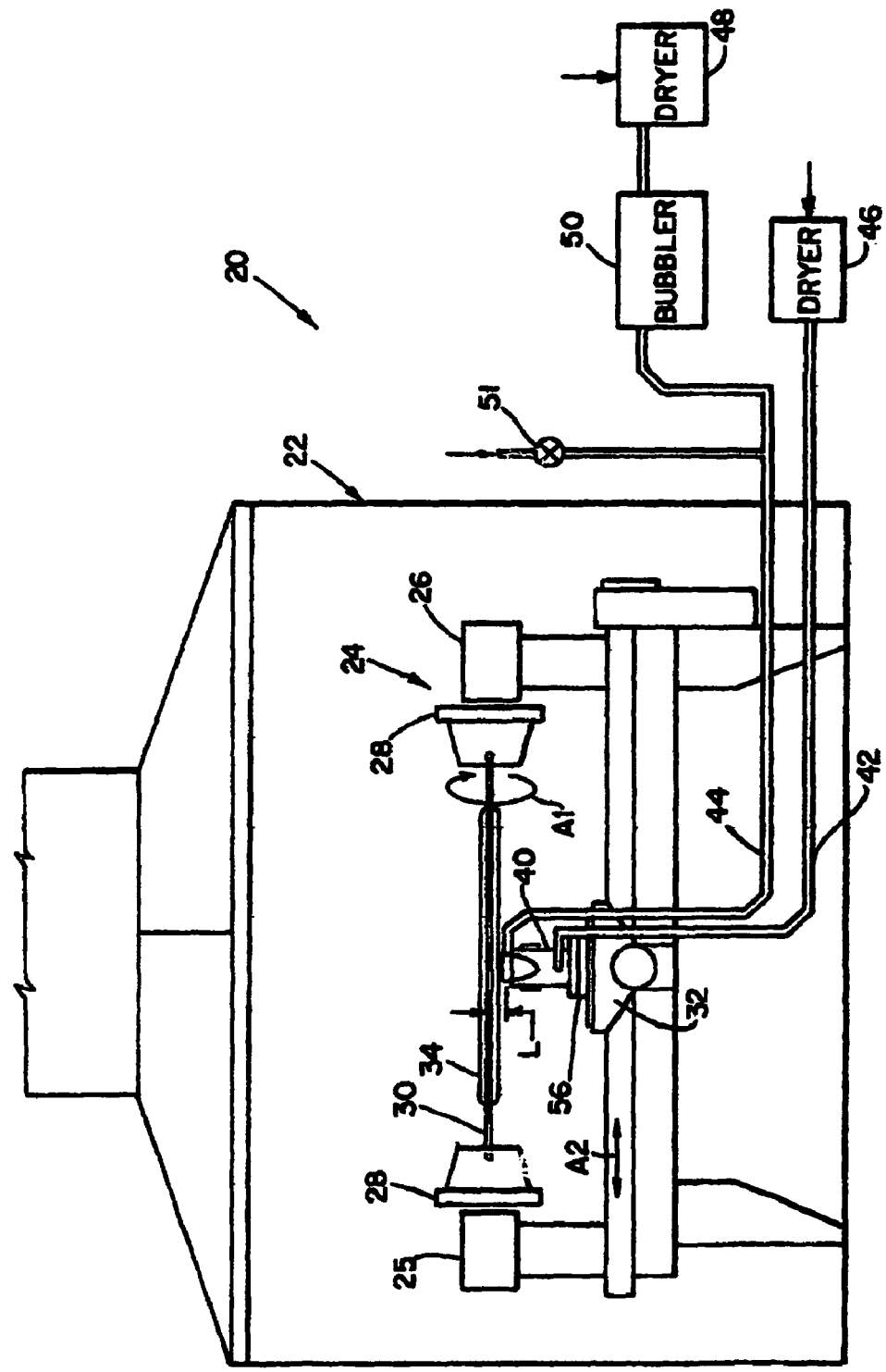
FIG. 1 illustrates an embodiment of the present plasma torch used with a deposition apparatus according to an embodiment of the present invention.

FIG. 1 shows an embodiment the present improved plasma torch for making synthetic glass with an exemplary apparatus 20 in accordance with the present invention. The apparatus comprises a hood 22, which provides proper exhaust to remove the gas by-products from the chemical reactions, and also provides RF isolation protection from the plasma torch such that the sealing prevents impurities from being introduced into the final product. Within the hood 22 is a lathe 24, such as that available from Litton Engineering Lab. The lathe, 24 has a headstock 25 and a tailstock 26. The headstock 25 and the tailstock 26 are provided with a pair of opposing rotating spindle chucks 28 which hold the ends of an elongated target 30 having a substantially cylindrical outer wall The spindle chucks 28 rotate target 30, as indicated by arrow A1. A movable carriage 32 movably mounted to the lathe 24 is arranged to travel in either direction along the target, as indicated by double headed arrow A2.

The present induction plasma torch, shown generally as 40, is supported by carriage 32. Carriage 32 thus moves induction plasma torch 40 along the length of the target 30. This results in the deposition of material on top of the target 30 to form a tubular member 34, which maybe a starter tube, or an optical fiber preform The spindle chucks 28 rotate the target 30 to ensure that material is uniformly deposited by the induction plasma torch 40 around the target so as to form a tubular member 34 having nearly perfectly cylindrical outer walls.

In the preferred embodiment, the induction plasma torch 40 positioned on the carriage 32 moves in both directions along a substantial portion of the length of the target 30. This allows the induction plasma torch 40 to travel along this portion of the target 30 and deposit materials.

Instead of moving the induction plasma torch 40 along the length of the target, the target 30 may be moved while the induction plasma torch 40 remains stationary. This can be realized by having the headstock 25 and the tailstock 26 of the lathe move the target in a reciprocating fashion so that all relevant portions of the target are brought directly above the induction plasma torch 40.

As another alternative, a plurality of plasma sources may be spaced apart along the length of the target. This allows for reduced movement of either the headstock 25 or tailstock 26 of the lathe 24, or the carriage 32 to which the plasma sources are attached, depending on which of the two is configured to move. In the extreme case where a great number of plasma sources are provided all along the length of the target, no movement of either the carriage 32 or the headstock 25 and tailstock 26 of the lathe 24 is needed. In the preferred embodiment, the plasma torch 40 is an induction plasma torch having a dry plasma gas introduced into it through a first gas line 42 and a source gas introduced into it through a second gas line 44.

The plasma gas is substantially comprised of nitrogen and oxygen in an appropriate, predetermined proportion. Air may serve as the plasma gas. In such case, air first passes through a first dryer 46 to remove moisture before entering the first gas line 42. This ensures that the hydroxyl concentration of the plasma gas is low, on the order of 1 ppm, or less.

The source gas comprises at least the main source chemical such as $SiCl_4$, with or without additional dopants and at least one carrier gas, such as oxygen or nitrogen. The carrier gases enter the second dryer 48 to remove moisture. This ensures that the hydroxyl concentration of the source gas is also very low, on the order of 0.5 ppm. After the carrier gases are dried, they proceed to a bubbler 50 or, as an alternative; a groups of bubblers could be used in place of bubbler 50 to pick up the source chemical. The gas stream comprising carrier gases laden with the source chemical then proceeds to the second gas line 44. Optionally, by opening valve 51, a dopant gas may be introduced into the gas stream before it reaches the induction plasma torch.

In the preferred embodiment, the source chemical is $SiCl_4$. This chemical is chosen for its reactive properties in a plasma. Specifically, the $SiCl_4$ serves as a source of Si to form $SiO_2$, which is deposited on the target 30. The dopant for lowering the index of refraction is typically a fluorine dopant gas in the form of $SiF_4$ $CF_4$ or $SF_6$. Fluorine dopants modify the index of refraction of the quartz and add a degree of freedom to the design of optical fiber preforms. The dopants for increasing the index refractions are typically in vapor form of $GeCl_4$, $POCl_3$, $AlCl_3$, and $TiCl_4$.

Figure 2:
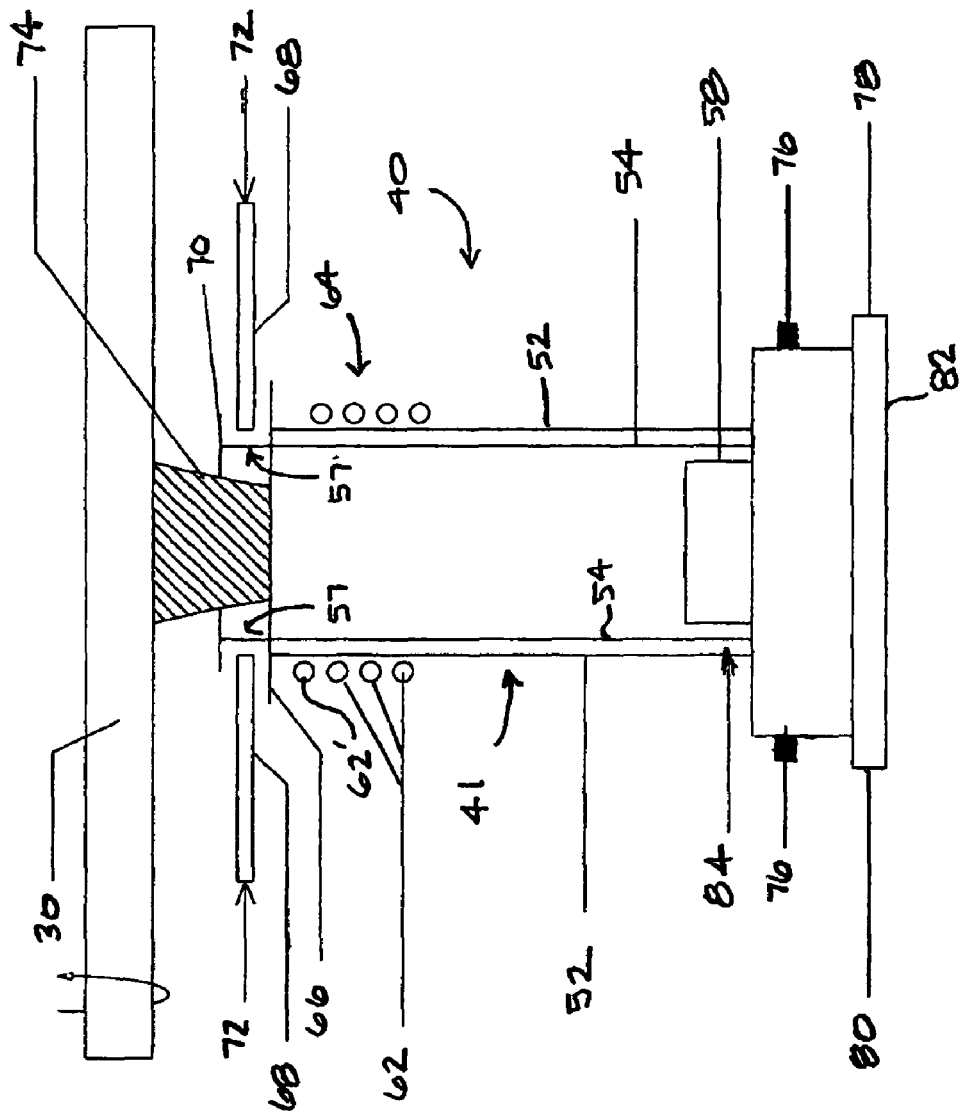
FIG. 2 illustrates cross-section side view of an embodiment of the present plasma torch depicting two ring disks according to an embodiment of the present invention.

FIG. 2 illustrates an embodiment of the present induction plasma torch 40 that includes two ring disks and three quartz tubes. The induction plasma torch 40 is positioned below the rotating target 30. The induction plasma torch 40 comprises a substantially tubular torch housing 41 formed from quartz. Preferably, the housing 41 has an overall diameter of 100 mm and a height of 310 mm. However, diameters ranging from 80-120 mm and heights between 180-400 mm may also be used.

In this embodiment, the middle quartz glass tube 54 is slightly taller than the outer quartz glass tube 52 and have two cut out openings or windows 57 opposite each other. The lower edge of the windows 57 are located at V=0 (FIG. 7) to achieve the same chemical injection location as taught in U.S. Pat. Nos. 6,253,580 and 6,536,240. In one aspect, the windows 57 have dimensions of 16 mm in height and 18 mm in width. The present induction plasma torch 40 also includes an inner quartz glass tube 58.

The middle quartz glass tube 54 is preferably tallest when compared with both the inner quartz glass tube 58 and the outer quartz glass tube 52. The outer quartz glass tube 52 is preferably taller than the inner quartz glass tube 58. The typical dimensions of the quartz glass tubes are: inner quartz glass tube 58 has an outer diameter of approximately 60 mm and a length of approximately 150 mm; the middle quartz glass tube 54 has an outer diameter of approximately 70 mm and a length of approximately 270 mm; and the outer quartz glass tube 52 has an outer diameter of approximately 85 mm and a length of approximately 200 mm.

Additionally, the present induction plasma torch 40 also includes a bottom quartz glass ring disk 66 and a top quartz glass ring disk 70. The bottom quartz glass ring disk 66 is welded substantially perpendicular onto the top of the outer quartz glass tube 52 above the coils 64 substantially perpendicular to the outer quartz glass tube 52 at its outer surface. The top quartz glass ring disk 70 is welded substantially perpendicular onto the top of the middle quartz glass tube 54. The dimensions of the quartz glass rings may be as follows: the bottom quartz glass ring disk 66 has an outer diameter of approximately 150 mm and an inner diameter of approximately 85 mm In addition, the top quartz glass ring disk 70 has an outer diameter of approximately 110 mm and an inner diameter of approximately 70 mm.

The bottom quartz glass ring disk 66 and top quartz glass ring disk 70 define the flow pattern of the screen gas (described below). They force the screen gas to have a horizontal radial outward flow on the top of the present induction plasma torch 40. This flow creates a lower pressure region for the plasma gases, which will cause it to flow outward from the middle quartz glass tube 54. This will increase the width of the plasma flame 74. The wider flame will increase the width of the deposition zone on the lateral surface of the rotating target 30. This results in higher deposition rates and efficiencies of the process. Moreover, the stability of the plasma flame 74 can be maintained by adjusting the flow rate of the screen gas.

Additionally, bottom quartz glass ring disk 66 and top quartz glass ring disk 70 have solid support from the middle quartz glass tube 54 and outer quartz glass tube 52 as compared to the stabilizer bars found in the prior art that have only one end attached to the quartz tubing. his new design increases the rigidity and decreases the repair and replacement costs of the present induction plasma torch 40.

A pair of chemical injection ports 68 for injecting chemicals 72 are located vertically between the bottom quartz glass ring disk 66 and the top quartz glass ring disk 70, and they are located horizontally between the outer quartz glass tube 52 and middle quartz glass tube 54 and aimed toward the cut out windows 57 of middle quartz glass tube 54. Through these chemical injection ports 68, the chemicals 72, for example $SiCl_4$, are introduced into the plasma flame 74 to produce silica soot particles that are deposited and consolidated on the rotating target 30.

The pair of chemical injection ports 68 is connected to the second gas line 44 for carrying the source chemicals 72 to the induction plasma torch 40. The chemical injection ports 68 typically comprise quartz tubing having a diameter of 5 mm, although tubing diameters on the order of 3-10 mm may be used with the present induction plasma torch 40. In this embodiment, the pair of chemical injection ports 68 is located relative to the housing 41 at the same height and each of the chemical injection ports 68 of the pair are positioned diametrically across from each other. Instead of just two such chemical injection ports 68; however, three or even more chemical injection ports 68, symmetrically arranged, maybe provided A pair of plasma gas inlets 76 connects the first gas line 42 carrying the plasma gases to the induction plasma torch 40. The plasma gas inlets 76 enter the housing 41 at substantially the same height, proximate to the base of the housing 41. These plasma gas inlets 76 typically comprise stainless steel tubing having a diameter of 5 mm, although a range of diameters may suffice for this purpose. The induction plasma torch 40 is also preferably includes a coolant inlet 78 and outlet 80. During use, a coolant, such as water, passes through the inlet 78, circulates within the outer wall of the housing 41, and exits through the outlet 80. The coolant inlet and outlet are formed from stainless steel and have a diameter of 5 mm. As with the plasma gas inlet and the injection port, the diameter of the coolant inlet 78 and outlet 80 may also vary to accommodate the desired thermodynamic properties of the induction plasma torch 40.

The plasma gas inlets 76, the coolant inlet 78, and the coolant outlet 80 are all preferably formed in a stainless steel chamber 82. The chamber 82 is a stainless steel square block 100 mm on a side, and having a height of approximately 40 mm The chamber 82 is mounted onto the support stand 56, which in turn, is mounted on the carriage 32 for movement along the rotating target 30. Preferably, the plasma gases are introduced tangentially through the plasma gas inlets 76 between the inner quartz glass tube 58 and middle quartz glass tube 54.

A screen gas, for example nitrogen, with a hydroxyl content of less than 1 ppm is introduced between the middle quartz glass tube 54 and the outer quartz glass tube 52 through screen gas port 84. The dry screen gas flows between middle quartz glass tube 54 and the outer quartz glass tube 52 creating a nitrogen curtail, which prevents the moisture diffusion from the surrounding environment, thereby decreasing the hydroxyl content in the deposited quartz glass layers. Using the active flow nitrogen curtain, the present induction plasma torch 40 is more effective in isolating the environmental influence and reducing the hydroxyl content than with passive stabilizer bars as found in the prior art.

The induction plasma torch 40 further includes a copper induction coil 64 that is provided around the upper portion of its housing 41. The coil 64 comprises a plurality of windings 62 having a diameter of approximately 95 mm and spaced apart from each other by approximately 6 mm. A gap between the housing 41 and the coil can be between 2-10 mm. The uppermost portion of the coil 64, as indicated by uppermost winding 62', is separated from the bottom quartz glass ring disk 66 by a fixed distance of approximately 2 mm. The induction coil 64 is located outside the outer quartz glass tube 52.

A high frequency generator (not shown) is electrically connected to the coil 64, powering the coil 64 with a variable power output up to 60 kW at a frequency of 5.28 +/−0.13 MHz. In the preferred embodiment, the generator is Model No. IG 60/5000, available from Fritz Huettinger Electronic GmbH of Germany. This generator is driven with a 50 Hz, 3-phase, 480 V power supply to energize the induction plasma torch 40.

As described above, the present plasma torch 40 is mounted on a movable carriage 32, which is located on a glass-working lathe 24. The movable carriage 32 moves back and forth along the rotating target 30 during the deposition process. Due to the weight of the supporting equipment of the induction plasma torch 40, the preferred operation is to hold the carriage movable 32 stationary and move the rotating target 30. The target rod or tube will be moved from right to left and then back to its original position or as the forward and reverse motions indicate.

Figure 3:
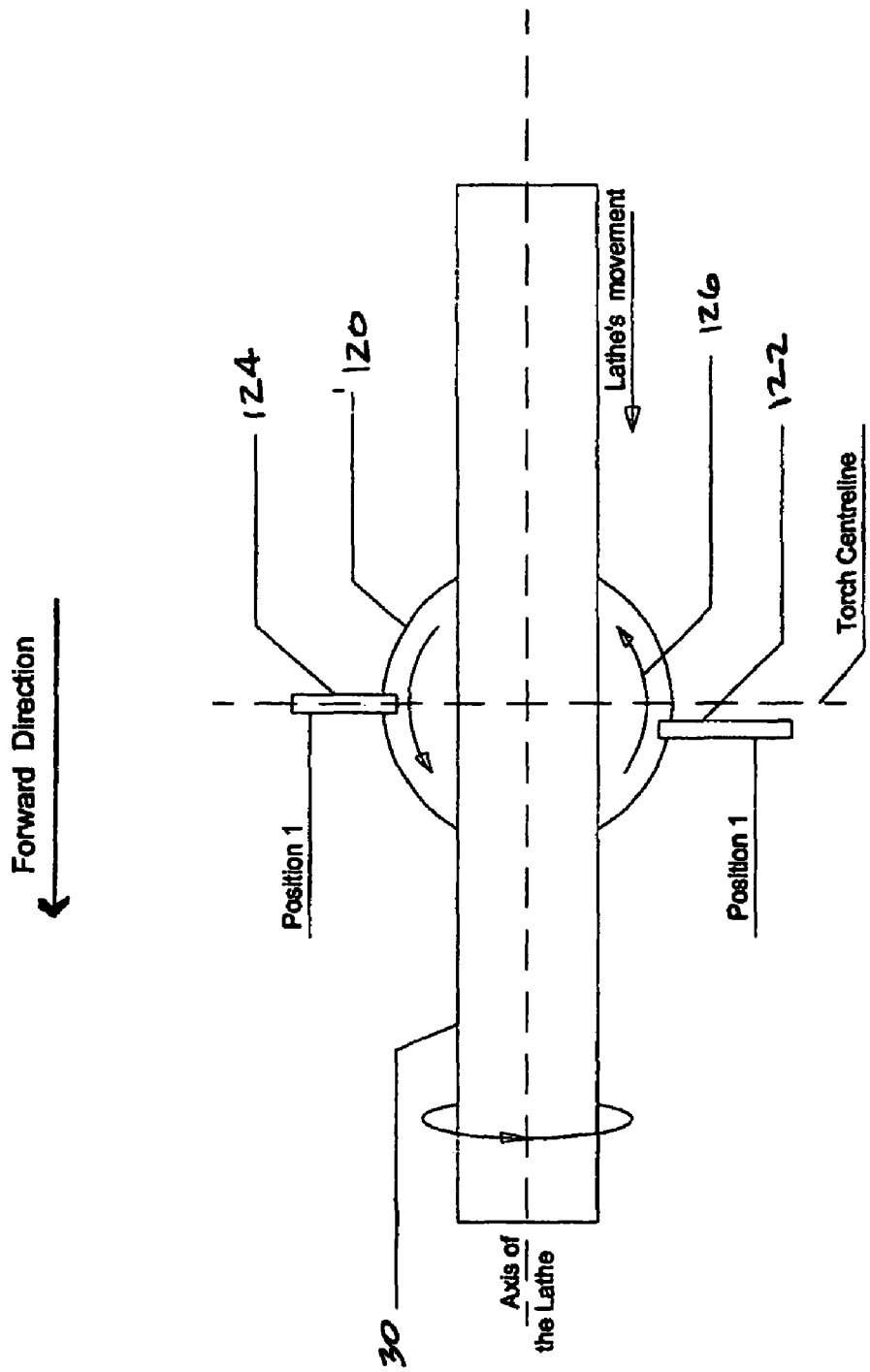
FIG. 3 illustrates a top plan view of another embodiment of the present plasma torch depicting a forward positioned nozzle according to an embodiment of the present invention.

FIG. 3 illustrates another embodiment 120 of the present induction plasma torch having one or more off-center chemical injection nozzles, front chemical injection nozzle 122 and back chemical injection nozzle 124. Typically, prior art plasma torches included chemical injection ports that are positioned directly opposing each other. In this embodiment, the back chemical nozzle 124 is inline with the centerline of the induction plasma torch 120, and the front chemical nozzle 122 is moved forward, same direction as the rotating target 30, about 8 mm ahead of the back chemical torch 124. With this arrangement and operated in the "forward direction", as shown in FIG. 3, an increase of deposition rate and the better control of the target diameter are achieved. This provides for a more uniform rotating target 30 diameter.

Preferably, an offset of 8 mm between the two nozzles provides improved deposition results. Additionally, this offsetting distance may be dependent upon several factors including: the size of the rotating target 30, the diameter of the induction plasma torch 120, the power generator being used, the plasma gas flow rate, and the raw chemicals used and also their feeding rate. Preferably, the offset can be in a range between 6 to 12 mm.

Figure 4:
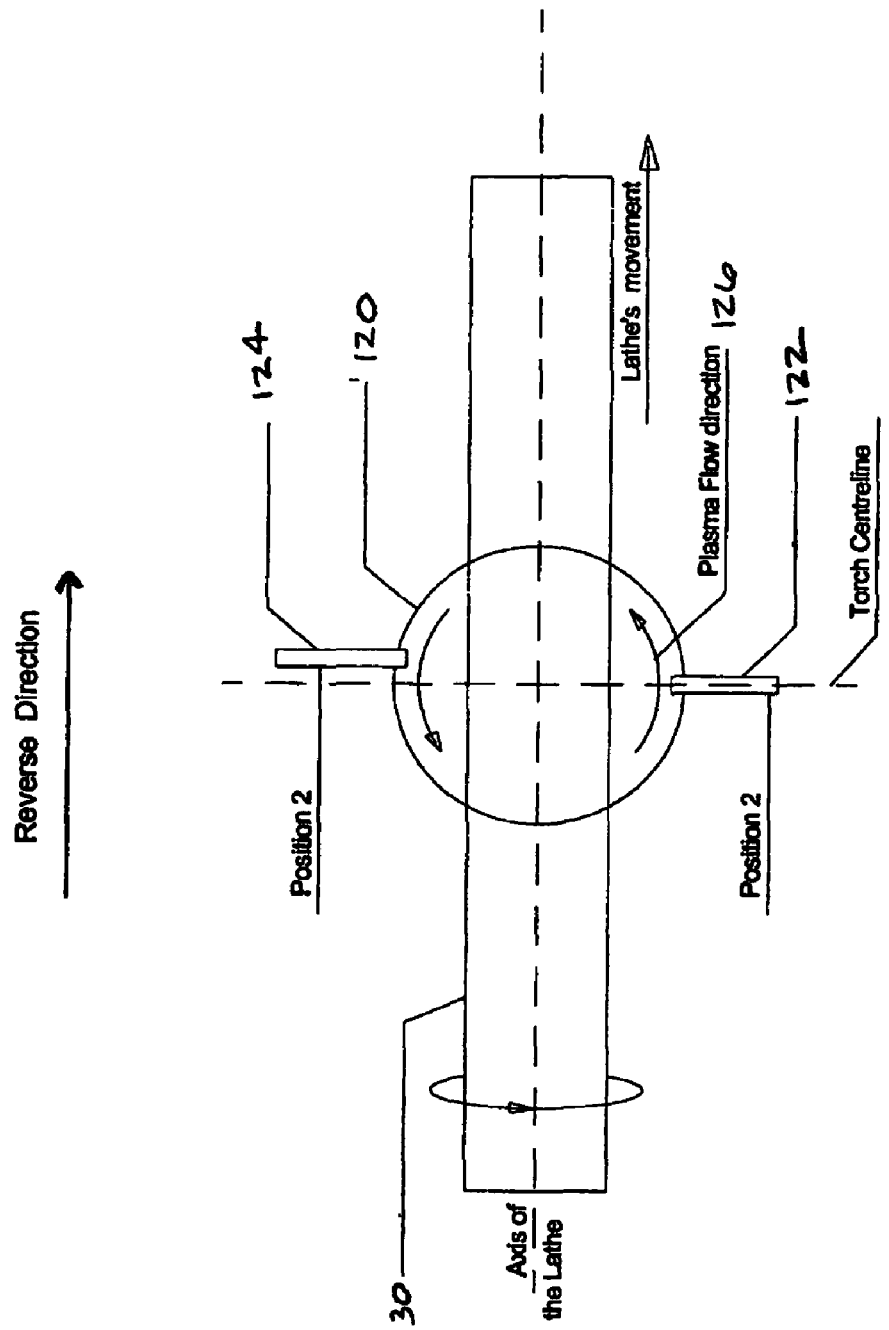
FIG. 4 illustrates a top plan view of another embodiment of the present plasma torch depicting a rearward positioned nozzle according to an embodiment of the present invention.

In this embodiment, the relative position for chemical injection nozzles 122 and 124 can be switched such that they are identical with respect to the direction of deposition. For example, in FIG. 4, a switched arrangement of the front chemical injection nozzle 122 and the back chemical injection nozzle is shown with respect to the reverse movement of the rotating target 30. As can be seen from viewing FIGS. 3 and 4, positions 1 and 2 of the nozzles are switched depending on the travel of either the rotating target 30 or the induction plasma torch 120. Referring to FIG. 4, the front chemical injection nozzle 122 is lined up with the centerline of the induction plasma torch 120, while the back chemical injection nozzle 124 is ahead of the front chemical injection nozzle 122 by approximately 8 mm.

In the forward direction as viewed by a person standing in front of the induction plasma torch 120, as shown in FIG. 3, the deposition is from the right end to the left end. The front chemical injection nozzle 122 is ahead of the induction plasma torch 120 centerline and the back chemical injection nozzle 124 is in-line with the induction plasma torch 120 centerline. In the reverse direction as viewed by a person standing in back of the induction plasma torch 120, as shown in FIG. 4, the deposition will be the right side moving to the left side. In this embodiment, the back chemical injection nozzle 124 and the front chemical injection nozzle 122 are switched very quickly from one to the other, just before the beginning of the pass. The Position 1 is for forward motion and Position 2 is for reversed motion.

In order to switch the position of the chemical injection nozzles 122 and 124, the width of the opening windows 57 is changed to approximately 20 mm and the location of the windows 57 are no longer directly opposing each other. Instead, there is an offset from each other. Enlarging the windows too much may cause excessive leakage of the plasma gases.

In addition, the switching position of the chemical injection nozzles 122 and 124 can also be accomplished by using two additional nozzles at pre-established and fixed positions. Additionally, different valves and electronic controls to supply the chemicals to the desired nozzles may also achieve the same function.

Oftentimes, a build-up at the tip of the chemical injection nozzles 68, 122, and 124 occurs during the deposition process. These build-ups can greatly reduce the deposition rate and the quality of the glass. Upon inspection, these build-ups are seen as barbs that are formed in the flow path of the chemical injection nozzles 68, 122, and 124.

It has been observed that when the flow rate of the reactant chemicals is increased a corresponding increase of deposition rate initially occurs, but that it levels off and then begins to decrease during the operation. This shows the importance of laminar flow for the efficient deposition of the injected chemicals. After a series of experimental tests of the chemical injection nozzles 68, 122, 124, the optimum condition has been discovered for the opening or the cross section area (CSA) of the chemical injection nozzles 68, 122, 124, the nozzle configurations, and chemical flow rates to maintain the laminar flow for the chemical injection nozzles 68, 122, 124. These optimum conditions minimized the soot particles that build-up at the tips of the chemical injection nozzles 68, 122, 124 and also resulted in reducing the particle size such that less chance for bubbles being trapped in the glass.

Preferably, the ideal particle size is between 0.02 to 0.05 mm for the present process. When the diameter of the deposited soot particles became very large, they became too difficult to consolidate. Very often, bubbles are also trapped in the glass with larger soot particles. When the laminar flow is maintained at a fixed level for the chemical injection nozzles 68, 122, 124, the particle's size was uniformly reduced, which improved the quality of the glass. Moreover, it also minimized the possible build up of soot particles at the tip of the chemical injection nozzles 68, 122, 124 and it reduced the need and frequency of maintenance.

Figure 5:
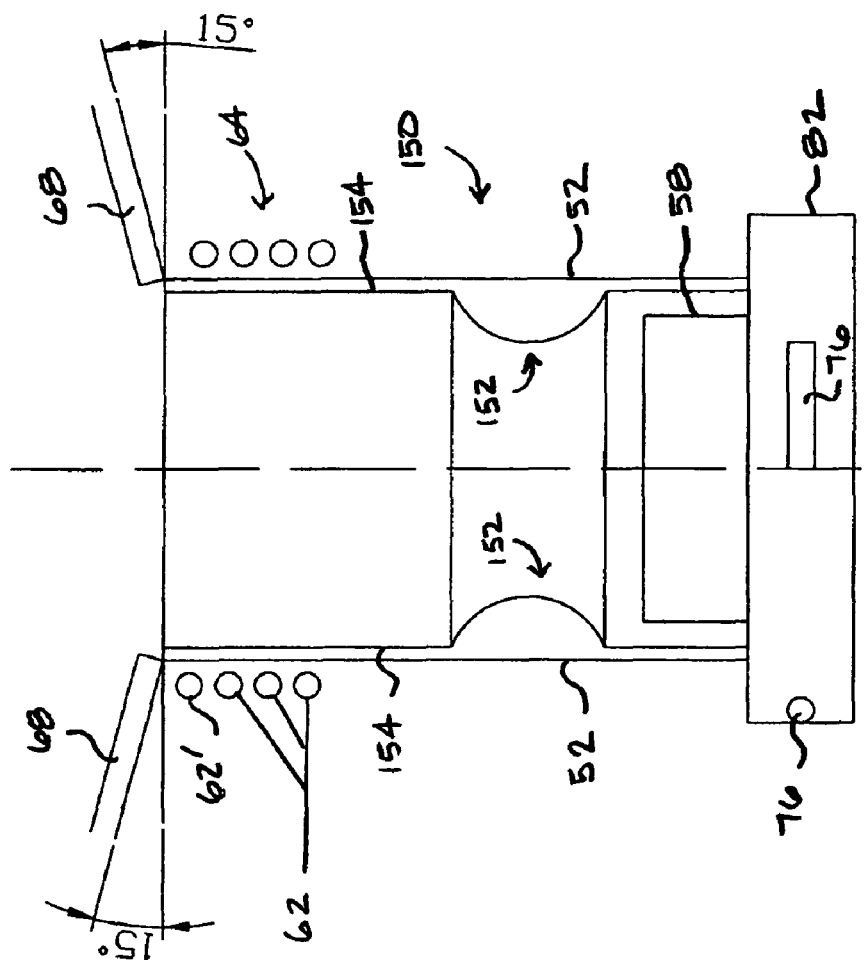
FIG. 5 illustrates a cross-section side view of another embodiment of the present plasma torch depicting a concaved area of the middle quartz tube according to an embodiment of the present invention.

FIG. 5 illustrates another embodiment 150 of the present induction plasma torch of the present invention. The induction plasma torch 150 includes a middle quartz glass tube 154 that has a concave section 152. Instead of using a uniform diameter from the bottom to the top of middle quartz glass tube 154, a concave section 152 is manufactured right above the top of the inner quartz glass tube 58. This concave section 152 gradually reduces the diameter to about 30% of its overall diameter and then curves back out to the normal diameter. As an example, the concave section 152 begins at approximately 3 mm above the top of the inner quartz glass tube 58. The total vertical length of the concave section is approximately 30 mm and the smallest diameter of the concave is approximately 50 mm. In one embodiment, the inner quartz glass tube 58 has an outer diameter of approximately 60 mm and a length of approximately 150 mm; the middle quartz glass tube 154 has an outer diameter of approximately 70 mm and a length of approximately 255 mm; and the outer quartz glass tube 52 has an outer diameter of approximately 85 mm and a length of approximately 200 mm. The advantages of the present induction plasma torch 150 is an increase in the efficiency of the induction plasma torch 150 and improved average plasma jet enthalpy.

It is known that the total energy W coupled to the induction plasma torch 150 will be dispersed to the radiation loss Wr, absorption by the quartz tube Wt, and transferred to the plasma jet A. A mathematical equation for this total energy is:

$$W = Wr + Wt + Wj \quad (1)$$

From the work by Reed (Journal Applied Physics Vol. 32, Page 821 (1961)) and also reported by Gutsol et al (Plasma Chemistry and Plasma Processing Vol. 22, Page 351 (2002)), the swirl flow pattern used in the present induction plasma torch 150 has a very unique character. The intense flow rotation results in formation of a recirculation zone. The reverse flow on the axis of the zone results in formation of a plasma "tail" that extends upstream of the inductor region (in the present embodiment below the coil). The length of this zone in the cold gas region can be many times larger than the tube diameter, thus it can reach to the vicinity of the plasma gas inlets 76.

Figure 6:
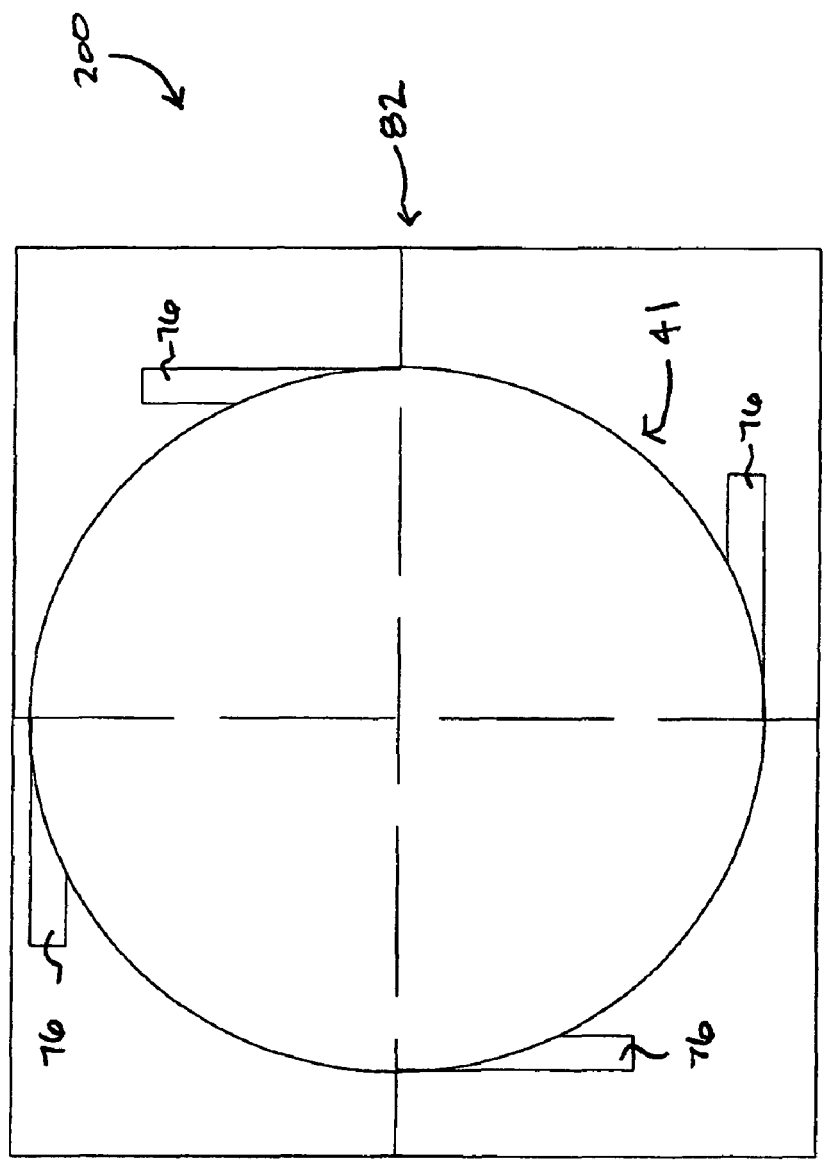
FIG. 6 illustrates a top plan view of another embodiment of the present plasma torch depicting an arrangement of additional gas inlets according to an embodiment of the present invention.

Referring to FIG. 6 illustrates a top plan view of another embodiment 200 of the present plasma torch depicting an arrangement of additional gas inlets according to an embodiment of the present invention. In this embodiment, four separate plasma gas inlets .76 are oriented tangentially about the chamber 82. As discussed above, these plasma gas inlets 76 connect the first gas line carrying the plasma gases to the induction plasma torch 40. These plasma gas inlets 76 may be the same dimensions and made of the same materials as described above. The number and orientation of these plasma gas inlets 76 produce a circular or swirl pattern of the plasma gas and improved plasma flame 74. Any number of plasma gas inlets 76 maybe used to achieve the desired flow pattern of the plasma gas.

Turning to FIG. 7, flow patterns from prior art induction plasma torches on the left is compared to the present induction plasma torch 150 on the right. Shown are the Skin Layer (SL), which was induced by the RF coils; the Plasma Recirculation Zone (RZ); and Streamlines (SM) for the flow of plasma gas. From FIG. 7, it is noticed that the plasma tail for the prior art plasma torches did extend toward the plasma gas inlets 76. For the present induction plasma torch 150, it was noticed that the plasma recirculation zone ended right above the concave section 152 and did not extend to the plasma gas inlets 76. This is because the diameter at concaved section 152 forced the streamlines to move towards the center of the tube and restricted the plasma tail to move further upstream. Thus the plasma recirculation zone became shorter (smaller) on the induction plasma torch 150. Because the plasma recirculation zone became smaller, the location for V=0 is also lowered.

When the plasma recirculation zone becomes smaller, it is obvious that the energy loss to the radiation will be less, as will be the loss to the quartz tube. From Eq. (1), it is seen that when the total coupled energy W is the same, but radiation loss Wr and energy absorbed by quartz tube Wt become less, more energy will be available for plasma jet Wj. In other words, Wj will be increased and becomes larger. Therefore, efficiency that is represented by the formula □=Wj/W will also be increased. Similarly, with the same total flow rate, the average plasma jet enthalpy Hj=Wj/Q is also increased; where Q is the total mass flow of the plasma gas.

Referring to FIGS. 6 and 7, the concave section 152 may be used with additional plasma gas inlets 76. For example, when four plasma gas inlets 76 are used, the flow rate can be reduced to each individual plasma gas inlet 76, while maintaining the designed total flow rate. This improves the rotational symmetry 126 (as shown in FIGS. 3 and 4) of the plasma flame or jet 74. This will also improve the stabilization of plasma flame or jet 74.

In this embodiment, four plasma gas inlets 76 are used. With this embodiment, the opposing two plasma gas inlets 76 may supply the main plasma gas, and the other two plasma gas inlets 76 maybe used as auxiliary. One will supply oxygen and the other nitrogen. This can increase the total gas flow rate without creating a turbulent flow. It also allows changing the oxygen to nitrogen ratio but maintain the same total flow during the process.

These four plasma gas inlets 76 do not need to be on the same plane and, as a result, controlling the location and the plane of the four plasma gas inlets 76 can create different kinds of flow patterns. Additionally, adjusting the individual gas flow to each plasma gas inlet 76 can create different kinds of flow patterns. Additional plasma gas inlets 76 may be used to supply gas phase raw materials such as Fluorine containing gas (e.g. $SiF_4$, $CF_4$ or $SF_6$). It is also possible to use them to supply vapor phase components of raw materials when we do not want the pre-mixing to occur before entering the reaction zone.

Referring to FIG. 5, chemical injection ports 68 are shown located at the top of the bottom quartz glass ring disk 66; however, instead of being perpendicular to the top of the outer quartz glass tube 52, they are aimed at approximately 15 degrees downward from that plane towards the center of the induction plasma torch 150 (where V=0). The angular inclination to which the chemical injection ports 68 are aimed downward depends on the diameter of the induction plasma torch 150, the dimensions of the concave section 152, the flow rate of plasma gas, the coupled plasma energy, and the chemical reactant raw materials.

As indicated above and in FIG. 7, the location of V=0 was lowered with the present induction plasma torch 150, so that the temperature at V=0 is higher. This is another benefit, which results from reducing the recirculation zone. This kind of arrangement can further take advantage of the unique temperature profile of the present plasma torch 150 and results in improved chemical conversion rates and made the particle sizes more uniform.

With respect to the induction plasma torch 150 of FIG. 5, the extension of the middle quartz glass tube 54 above the outer quartz glass tube 52 as shown in FIG. 2 can be eliminated. By shortening the middle quartz glass tube 54, the windows 57 for the chemical injection can also be eliminated. In this embodiment, after the middle quartz tube glass 54 is shortened, the top and bottom rings become much closer. It is also possible to eliminate the top quartz glass ring disk 70 because the bottom quartz glass ring disk 66 is adequate to form the desired air curtain.

In induction plasma torch 150 of FIG. 5, the bottom quartz glass ring disk 66 will be able to form the screen gas with a horizontal radial outward flow direction. This is because the bottom quartz glass ring disk 66 by itself can provide the necessary environmental shield. For this embodiment, the removal of the top quartz glass ring disk 70 will save the equipment manufacture cost, simplify the design, and make the induction plasma torch 150 more compact.

With these modifications, the enthalpy of the plasma flame 74 is increased without requiring an increase of the power from the generator. This provides for increased productivity without using a larger power supply. Moreover, the process efficiency was also increase by approximately 10% and, as well, the process also greatly reduced bubble formation in the deposited glass.

The present induction plasma torches 40, 120, 150, and 200 may be operated in a horizontal mode to deposit silica for making preforms, tubes, rods, or all three. In addition, the present induction plasma torches, 40, 120, 150, and 200 may be used to deposit silica glass in a vertical mode fashion that will allow us to make glass blanks or ingots.

By using all the features taught in induction plasma torches 40, 120, and 150, it was found that significant improvements in deposition rates and efficiencies (material utilization) can be achieved. The following Table 1 show the comparison of a prior art induction plasma torch with the induction plasma torch 150.

TABLE 1

| Target Diameter (mm) | Average Deposition Rate (g/min) Prior Art | Average Deposition Rate (g/min) Embodiment 150 | Average Deposition Efficiency (%) Prior Art | Average Deposition Efficiency (%) Embodiment 150 |
|---|---|---|---|---|
| 20-30 | 1.5 | 3.5 | 10 | 28 |
| 30-70 | 6.5 | 9.0 | 50 | 70 |

A manufacturing example will show the real advantage of these improvements. To deposit glass onto a meter long glass target with an initial outer diameter of 20 mm so as to grow its final outer diameter to 70 mm, it would take a little more than 27 hours with prior art induction plasma torch designs. But as a result of the induction plasma torches taught herein, the process will take less than 17 hours, thus saving ten hours of process time. In other words, for the same manufacturing time period, the throughput can be increased by about 40%. This also results in a significant reduction of labor costs. These significant savings are put into perspective when one considers that this new induction plasma torch will enable the manufacturing of the same amount of product as the prior art with only sixty percent 60% of the equipment. This translates into a savings 40% on the capital investment. The other advantage of the present design is shown from the consideration from the raw material usage. The induction plasma torch of this invention results in a 40% savings in material costs.

There has been described a novel plasma torch for making synthetic silica. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, the coils and power requirements for the coils that are described can be made be made from different materials and operated at different power settings. It is also evident that the dimensions of the quartz tubes recited may greater or lesser for a desired application

What is claimed:

1. A plasma torch for making synthetic silica comprising:
an outer quartz glass tube having a first length and a first cross-section diameter and a first end connected to a base and a second end oriented towards a substrate, said outer quartz glass tube encircled by an induction coil;
an inner quartz glass tube having a second length and a second cross-section diameter and a first end connected to said base and a second end oriented towards said substrate, said second cross-section diameter being smaller than said first cross-section diameter such that said inner quartz glass tube is located substantially parallel to and inside of said outer quartz glass tube;
a middle quartz glass tube having a third length and a third cross-section diameter and a first end connected to said base and a second end oriented towards said substrate, said third cross-section diameter being less than said first cross-section diameter and greater than said second cross-section diameter such that said middle quartz glass tube is located substantially parallel to and between said outer quartz glass tube and said inner quartz glass tube for providing a pathway between said middle quartz glass tube and said outer quartz glass tube for a screen gas, and for providing a pathway between said inner quartz glass tube and said middle quartz glass tube for a plasma gas to produce a plasma flame when said induction coil is energized;
a first quartz glass ring disk concentrically connected to said second end of said outer quartz glass tube;
a second quartz glass ring disk concentrically connected to said second end of said middle quartz glass tube, wherein the flow pattern of said screen gas is determined by said first quartz glass ring disk and said second quartz glass ring disk; and
at least one chemical injection nozzle located between said first quartz glass ring disk and said second quartz glass ring disk for injecting a chemical source gas into said plasma flame.

2. The plasma torch for making synthetic silica of claim 1 wherein said second end of said middle quartz glass tube extends beyond said second end of said outer quartz glass tube.

3. The plasma torch for making synthetic silica of claim 1 wherein said second end of said outer quartz glass tube extends beyond said second end of said inner quartz glass tube.

4. The plasma torch for making synthetic silica of claim 1 wherein said first and second quartz glass ring disk are substantially perpendicular to said middle quartz glass tube.

5. The plasma torch for making synthetic silica of claim 1 wherein said middle quartz glass tube further comprises:
at least one opening located substantially near said second end of said middle quartz glass tube for providing a passageway for said injected chemical source gas into said plasma flame.

6. The plasma torch for making synthetic silica of claim 1 wherein said at least one opening is located vertically between said first and second quartz glass ring disks.

7. The plasma torch for making synthetic silica of claim 1 wherein said first, second, and third cross-section diameters are concentric with one another.

8. The plasma torch for making synthetic silica of claim 1 wherein said at least one chemical injection nozzles comprises:
   a first chemical injection nozzle located at the centerline of said plasma torch; and
   a second chemical injection nozzle located forward of said centerline of said plasma torch.

9. The plasma torch for making synthetic silica of claim 1 wherein said middle quartz glass tube has a formed concave restriction around its perimeter above said inner quartz glass tube.

10. The plasma torch for making synthetic silica of claim 1 wherein said at least one chemical injection nozzles are angled downward from a horizontal plane.

11. A plasma deposition apparatus for making synthetic silica comprising:
   a plasma torch comprising: an outer quartz glass tube having one end substantially perpendicular to a substrate, said outer quartz glass tube encircled by an induction coil;
   an inner quartz glass tube having one end substantially perpendicular to said substrate;
   a middle quartz glass tube having one end substantially perpendicular to said substrate, said middle quartz glass tube located between said outer quartz glass tube and said inner quartz glass tube, wherein said tubes are concentric to provide a first pathway located between said inner quartz glass tube and said middle quartz glass tube for a plasma gas to produce a plasma flame when said induction coil is energized and a second pathway located between said outer quartz glass tube and said middle quartz glass tube for a screen gas;
   a first quartz glass ring disk concentrically connected to said one end of said outer quartz glass tube;
   a second quartz glass ring disk concentrically connected to said one end of said middle quartz glass tube, wherein the flow pattern of said screen gas is determined by said first quartz glass ring disk and said second quartz glass ring disk;
   at least one chemical injection nozzle located between said first quartz glass ring disk and said second quartz glass ring disk for injecting a chemical source gas into said plasma flame; and
   means for supporting said substrate, wherein said substrate and said means for supporting move relative to each other.

12. The plasma deposition apparatus for making synthetic silica of claim 11 wherein said one end of said middle quartz glass tube extends beyond said one end of said outer quartz glass tube.

13. The plasma deposition apparatus for making synthetic silica of claim 11 wherein said one end of said outer quartz glass tube extends beyond said one end of said inner quartz glass tube.

14. The plasma deposition apparatus for making synthetic silica of claim 11 wherein said first and second quartz glass ring disk are substantially perpendicular to said middle quartz glass tube.

15. The plasma deposition apparatus for making synthetic silica of claim 11 wherein said middle quartz glass tube further comprises:
   at least one opening located substantially near said one end of said middle quartz glass tube for providing a passageway for said injected chemical source gas into said plasma flame.

16. The plasma deposition apparatus for making synthetic silica of claim 11 wherein said at least one opening is located vertically between said first and second quartz glass ring disks.

17. The plasma deposition apparatus for making synthetic silica of claim 11 wherein said at least one chemical injection nozzles comprises:
   a first chemical injection nozzle located at the centerline of said plasma torch; and
   a second chemical injection nozzle located forward of said centerline of said plasma torch.

18. The plasma deposition apparatus for making synthetic silica of claim 17 wherein said plasma torch rotates axially relative to said substrate for presenting said second chemical injection nozzle as the forward chemical injection nozzle during said movement of said substrate to said plasma torch.

19. The plasma deposition apparatus for making synthetic silica of claim 11 wherein said middle quartz glass tube has a formed concave section around its perimeter above said inner quartz glass tube.

20. The plasma deposition apparatus for making synthetic silica of claim 11 wherein said at least one chemical injection nozzles are angled downward from a horizontal plane.

* * * * *